(12) United States Patent
Nicol

(10) Patent No.: US 8,739,651 B2
(45) Date of Patent: Jun. 3, 2014

(54) HANDLEBAR ASSEMBLY FOR BICYCLES AND BICYCLE HAVING A HANDLEBAR ASSEMBLY

(76) Inventor: Morgan Nicol, Barbengo (CH)

( * ) Notice: Subject to any disclaimer, the term of this patent is extended or adjusted under 35 U.S.C. 154(b) by 776 days.

(21) Appl. No.: 11/233,941

(22) Filed: Sep. 23, 2005

(65) Prior Publication Data

US 2007/0175292 A1   Aug. 2, 2007

(51) Int. Cl.
*B62K 21/12* (2006.01)
*B62K 21/00* (2006.01)

(52) U.S. Cl.
USPC ........................................................ 74/551.1

(58) Field of Classification Search
USPC .............. 74/551.1–551.9, 543, 544; 280/276, 280/279
See application file for complete search history.

(56) References Cited

U.S. PATENT DOCUMENTS

| | | | | | |
|---|---|---|---|---|---|
| 527,576 | A | * | 10/1894 | Woodard | 74/551.5 |
| 578,180 | A | * | 3/1897 | Wood | 74/551.4 |
| 615,793 | A | * | 12/1898 | Bowman | 74/551.9 |
| 1,424,695 | A | * | 8/1922 | Violet | 280/276 |
| 1,719,007 | A | | 7/1929 | Gazda | |
| 2,135,692 | A | * | 11/1938 | Anderson | 74/551.2 |
| 2,222,121 | A | * | 11/1940 | Roberts | 74/551.9 |
| D247,170 | S | * | 2/1978 | Heber | D12/178 |
| 4,308,762 | A | * | 1/1982 | Jannard | 74/551.9 |
| 4,420,989 | A | * | 12/1983 | Finkle | 74/551.2 |
| 4,748,928 | A | * | 6/1988 | Nakamura | 114/144 R |
| 5,195,394 | A | * | 3/1993 | Latta | 74/551.8 |
| 5,555,775 | A | * | 9/1996 | D'Aluisio et al. | 74/551.5 |
| 5,557,982 | A | * | 9/1996 | Voss et al. | 74/551.1 |
| 5,782,139 | A | * | 7/1998 | Fraiman | 74/551.1 |
| 6,467,372 | B2 | * | 10/2002 | Klieber | 74/551.1 |
| 7,147,237 | B2 | | 12/2006 | Cobb et al. | |
| 7,644,642 | B2 | * | 1/2010 | Paris et al. | 74/551.8 |
| 2001/0022115 | A1 | * | 9/2001 | Klieber | 74/551.1 |
| 2002/0194945 | A1 | * | 12/2002 | Greetis | 74/551.8 |
| 2003/0089191 | A1 | * | 5/2003 | Nielsen | 74/551.3 |

FOREIGN PATENT DOCUMENTS

| | | | |
|---|---|---|---|
| EP | 135420 A1 | * | 3/1985 |
| FR | 640366 | | 7/1928 |
| GB | 2161120 A | * | 1/1986 |
| GB | 2376927 A | * | 12/2002 |
| JP | 10129565 | | 5/1998 |

* cited by examiner

*Primary Examiner* — Daniel Yabut
(74) *Attorney, Agent, or Firm* — Greer, Burns & Crain, Ltd.

(57) ABSTRACT

A handlebar assembly for a two-wheeled vehicle, in particular a bicycle having a first end and having a second end and having a mounting portion positioned between the ends, wherein the handlebar assembly forms at least one through hole or passage area for air flowing through between said first end and the second end, and a bicycle having such a handlebar assembly.

15 Claims, 5 Drawing Sheets

HANDLEBAR ASSEMBLY FOR BICYCLES AND BICYCLE HAVING A HANDLEBAR ASSEMBLY

BACKGROUND

The invention relates to a handlebar assembly for two-wheeled vehicles and in particular for bicycles, and a two-wheeled vehicle in particular a bicycle having a handlebar assembly.

Handlebars or handlebar assemblies for bicycles or other two-wheeled vehicles such as motorcycles, mopeds or the like, have been known in various embodiments.

In particular in bicycles such handlebars, also referred to as bars, are usually mounted to a handlebar stem. Said handlebar stem typically connects the handlebar with the fork column of the front wheel fork which in turn receives the front wheel of the bicycle in dropouts or fork ends. Handlebars generally comprise a mounting area typically configured as a cylindrical and usually enlarged section of the handlebar for attachment to such a handlebar stem. Although this mounting portion is generally received in a clamp-like element on the handlebar stem, other variants are also conceivable. As a rule this clamp element on the stem comprises a screw which generates the locking force for securing the handlebar to the handlebar stem.

Although it needs not necessarily be the case, the handlebar mounting portion is as a rule located midpoint, in the center relative to the handlebar width.

Such handlebars comprise a first end and a second end. Extra attachments may also be provided to be secured to known handlebars for example for providing additional grip areas.

When configuring handlebars sufficient sturdiness will always be imperative since a breaking handlebar while a bicycle is in operation may bring the rider into very dangerous situations. When rapidly accelerating for example many bicycle riders tend to pull the handlebar by the grip areas toward their bodies. This is frequently done by alternately pulling toward him the one and then the other grip area. This "snatching" may result in additional load to the handlebar which as a rule it must be able to withstand. A plurality of handlebars have already become known which are configured to be sturdy enough to withstand the loads applied to the handlebar while a bicycle is in operation. It has further become known to position at the handlebars, handlebars or attachments attached thereto and/or forearm supports supported on the handlebars, such that the rider is forced to take a position where his shoulders are relatively close to one another so as to lower the rider's air resistance.

The object of the present invention is to provide a handlebar assembly having good aerodynamic characteristics while being safe to operate.

SUMMARY OF THE INVENTION

According to the invention a handlebar assembly in particular is proposed for a two-wheeled vehicle, in particular a bicycle, comprising a first end and a second end and a mounting portion positioned between said pair of ends. The mounting portion is for example formed by a cylindrical tube or rod portion. The mounting portion is in particular intended to receive in the region of said mounting portion the handlebar assembly on a handlebar stem of a bicycle or a two-wheeled vehicle. This acceptance may in particular occur in a way known per se in that the mounting portion is clamped onto or into the handlebar stem. According to the invention it is in particular provided that the handlebar assembly forms, between its first end and its second end, at least one through hole or passage area, in particular at least one through hole or passage area for an air flow or for air flowing through.

It should be noted that such air flow or air flowing through is present or occurs in particular with the handlebar assembly being mounted to a bicycle or a handlebar stem of a bicycle and the bicycle is moved in a forward ride.

A preferred configuration provides that the handlebar assembly forms, between its first end and its second end, two passages or passage areas separate from one another which are in particular passages or passage areas for an air flow.

It may in particular be provided that such a through hole or passage area of the handlebar assembly is a slot or is configured slot-like. Such a slot may in particular be such that the slot height which is substantially perpendicular to the slot length, is constant along the slot length or varies along the slot length. In a preferred configuration the at least one through hole or passage area is limited in circumference by a closed wall section. It is in particular provided that the through hole or passage area is limited by a section of the outer surface of the handlebar assembly, in particular in circumference. It may in particular be provided that the through hole or passage area is limited along its entire direction of extension by sections of the outer surface of the handlebar assembly. The through hole or passage area may for example be formed between two parallel-connected tubes or tube sections. Such parallel-connected tubes or tube sections may, directly or through intermediate tubes, be connected with one another at their ends. It may be provided that each of such parallel-connected tubes or tube sections has at least one hollow space formed inside it. Thus, these tubes or tube sections which are parallel-connected so as to form a through hole or passage area, may in particular be tubes in the original meaning. It may be provided though that such tubes or tube sections which are parallel-connected so as to form a through hole or passage area, consist of solid material thus strictly speaking being rods or being configured rod-like. To simplify matters though, reference is made to tubes or tube sections.

It may further be provided that the parallel-connected tubes or tube sections which form a through hole or passage area for an air flow, are elliptical in cross-section transverse to their central axis. It may be provided that such elliptical cross-sectional shape extends substantially constantly along the central axis which may for example be curved at least in portions such that the main axes of said elliptical shape are constant. It may however be provided that such parallel-connected tubes or tube sections vary in their cross-sectional shape along the central axis. Such variation may for example be such that the ratio of the principal axis of the elliptical shape relative to the secondary axis of the respective elliptical shape varies along the central axis of the respective tube or tube section, or such that although said ratio remains constant, the surface area of the cross-sectional area varies.

It may however be provided that these parallel-connected tubes or tube sections are configured non-elliptical or are configured elliptical only in portions along their central axis.

It is furthermore preferred that the parallel-connected tubes or tube sections between which a through hole or passage area is formed, are configured to be rectangular tubes.

It is in particular preferred both for a configuration where said tubes or tube sections are configured to be rectangular tubes and for a configuration where said tubes or tube sections are configured to be elliptical in cross-section, that the through hole or passage area—relative to the respective cross-section of the respective parallel-connected tubes or tube sections—between the respective principal directions of extension of said (respective cross-section of the) respective tube or tube section—is formed in particular relative to the respectively identical (cross-) sectional plane. Given a respective elliptical cross-sectional configuration of the parallel-connected tubes or tube sections this is in particular such that—in particular relative to respective identical (cross-) sectional planes—the through hole or passage area is formed between the respective principal axes of the ellipses.

A preferred configuration provides that the mounting portion is located midpoint in the center relative to the handlebar width wherein it is in particular provided that precisely one mounting portion is provided.

It may be provided that an imaginary plane is located transverse to the longitudinal direction of extension of the mounting portion which is in particular configured cylindrically and is intersected by the mounting portion, wherein no other areas of the handlebar assembly extend through or intersect said imaginary plane, other than that mounting portion.

In a preferred configuration the handlebar assembly is configured in mirror symmetry relative to a plane positioned perpendicular to the direction of its width. This plane is located midpoint in particular relative to the width of the handlebar assembly.

The direction of the width is in particular that direction which—if the handlebar assembly is mounted to a bicycle—in straight-line travel of the bicycle is located transverse to the central plane of the bicycle which is determined in particular by the plane of the wheels.

A very preferred configuration provides that between the mounting portion through which the handlebar assembly can be received at or in a stem, and the first end of the handlebar assembly, a first through hole or passage area is formed, and between said mounting portion and the second end of the handlebar assembly, a second through hole or passage area that is different from the first through hole is formed wherein said first through hole and said second through hole are in particular respective through holes for air flowing through.

Reference is again made to the fact that parallel-connected tubes or tube sections between which a respective through hole or passage area (for an air flow or air flowing through) is formed in a preferred configuration, may also consist of solid material such that there are substantially no hollow spaces formed in their respective interiors. In this sense, instead of tubes or tube sections that are configured parallel and between which a through hole or passage area for an air flow is formed, one may also speak of rods or rod sections or struts or strut sections.

The handlebar assembly is preferably configured integrally. It may as well comprise receiving sections for receiving further grip areas or sections at which the grip areas or support areas such as support areas for a forearm are formed such as bar ends or the like.

A preferred configuration has the handlebar assembly which, as mentioned, is preferably configured integrally, manufactured entirely of solid material.

Furthermore it is in particular preferred that between the mounting area of the handlebar assembly which is located centrally or midpoint in particular relative to the width, and the first end of the handlebar assembly, a first through hole or passage area for an air flow is provided and between said first through hole or passage area and the first end of the handlebar assembly, a first grip area is provided. It is further preferred in particular in combination with the afore-mentioned configuration that a second through hole or passage area for air flowing through is provided between the mentioned mounting portion of the handlebar assembly and the second end of the handlebar assembly, and a second grip area is present between said second through hole or passage area and the second end of the handlebar assembly.

The first grip area and the second grip area serve in particular to let the rider of a bicycle take hold of these grip areas with both his hands for steering the bicycle.

As mentioned it is conceivable to provide as a supplement—in particular at further attachments mounted to the handlebar assembly such as bar ends or the like—further grip areas which can be grasped alternatively to the discussed first grip area and the discussed second grip area. Such attachments may for example be configured such that they force the rider of a bicycle equipped with the handlebar assembly according to the invention, into a position where his shoulders are relatively close to one another so as to lower the motion resistance caused by his body. It may be provided that support areas for the forearms are provided in combination with such additional grips provided in particular at an attachment which force the rider into a position where his shoulders are relatively close to one another. Such support areas may in particular be provided at one of the parallel-connected tubes or tube sections or struts or strut sections each. This applies in particular to a configuration where on both sides of the central plane positioned perpendicular to the width of the handlebar assembly, one through hole or passage area each is formed which is formed between parallel-connected tubes or tube sections or rods or rod sections or struts or strut sections.

There may be plate-like support areas for the forearms mounted in the mentioned region.

In a particularly preferred configuration, receiving areas for attachments are provided in the region of the first end and in the region of the second end of the handlebar assembly wherein for example additional grip areas may be comprised or which may for example be a brake lever. It is very preferred that said receiving areas extend substantially perpendicular to the handlebar assembly mounting portion that is in particular configured cylindrically.

In a preferred configuration the handlebar assembly extends substantially in a U-shape between its first end and its second end. It is in particular provided that portions or areas are provided along said U-shape where the handlebar assembly bifurcates or diverges, forming parallel-connected tubes or tube sections or struts or strut sections or rods or rod sections between which a through hole or passage area is formed, and then joins again. Preferably such bifurcating and then rejoining sections are provided in the U-shape on both sides of the central plane of the handlebar assembly which extends transverse to the direction of the width.

Furthermore according to the invention a bicycle according to claim 20 is in particular proposed.

According to the invention in particular a bicycle having a stem and a handlebar assembly is provided. The handlebar assembly comprises a mounting portion which, as mentioned above, for example is formed by a cylindrical section which is preferably positioned midpoint in the center relative to the width of the handlebar assembly. The handlebar assembly is received at the stem by means of said mounting portion. This may for example be such that—in a known way—the stem comprises a clamping means. The clamping means may for example be a substantially clamp-like portion for holding or affixing or clamping the handlebar assembly by means of a type of tightening screw, as is already known.

The tightening screw may also be sunk in this clamp-like portion. It is in particular provided that the clamp-like portion is configured such that the handlebar assembly can be inserted in said clamp-like portion transverse to the direction of longitudinal extension of its mounting portion which as mentioned is in particular configured cylindrically, and subsequently it can be clamped there in particular by means of a tightening screw.

Preferably the mounting portion extends transverse to the direction of travel of the bicycle.

In a preferred configuration the handlebar assembly can be or is fixed to the stem such that the air flow occurring in forward travel of the bicycle flows through the at least one through hole or passage area. It is understood that of course not the entire air flowing past the bicycle can flow through this through hole or passage area. The above statements should thus be understood in particular in that air flows through this through hole or passage area.

It may be provided that the handlebar assembly is equipped with air guide means. Such air guide means may in particular be configured integrally with the handlebar assembly. In a preferred configuration the air guide means are configured such that as the bicycle travels forward they affect the air flow occurring relative to the bicycle such that by means of the air guide means, flowing air is guided outwardly relative to the plane determined by the wheel plane of the front wheel of the bicycle. This may in particular be such that air thus flowing is guided on both sides of said plane. A preferred configuration provides that the air is guided such that at least part of it is guided away from the rider of the bicycle such that the resistance to air flow of the unit of bicycle and bicycle rider is lowered. It is in particular provided that the air guide means are configured such that the air flowing through the through hole or the passage opening of the handlebar assembly during forward travel of the bicycle, relative to a respective through hole or passage area, is guided outwardly or away from the mentioned plane. Thus it may certainly be provided that air is partially guided in the direction of this plane and partially outwardly as mentioned wherein the air mass flow rate flowing through the respective through hole or passage opening is on average guided outwardly or away from the mentioned plane.

Such through holes or passage areas having corresponding air guide means may in particular be positioned at both sides of the mentioned plane, as is explained in more detail or as an example at another place of this disclosure.

It may in particular be provided that the mentioned air guide means are formed in the at least one through hole or passage area or by the wall sections or profiles limiting the respective through hole or passage area.

The through hole(s) or passage area(s) which are in particular for an air flow or for air flowing through are preferably positioned spaced from the first end and spaced from the second end of the handlebar assembly.

It is in particular preferred that the handlebar assembly is configured closed at its first and at its second end in particular at the front face, and in particular including the case that they are not formed of solid material but hollow or at least partly hollow.

Each of the first end and the second end of the handlebar assembly is preferably a free end.

It is in particular preferred that the—in particular imaginary—straight connecting line extends between the first and the second end of the handlebar assembly substantially parallel to the mounting portion, configured in particular cylindrically, of the handlebar assembly or to the central longitudinal axis of this mounting portion. Herein it is in particular provided that this (imaginary) connecting line is spaced apart from this mounting portion or its central longitudinal axis perpendicular to said longitudinal axis or connecting line.

In a very preferred configuration the handlebar assembly comprises at least one section or area where the handlebar assembly diverges to form a through hole or passage area for air flowing through and subsequently rejoins. It is particularly preferred that two such sections or areas are provided which diverge to form a through hole or passage area for air flowing through and subsequently rejoin. It may for example be provided that these two areas are positioned on different sides of said central plane, in particular spaced apart from one another, and in particular in mirror symmetry to one another, relative to a central plane that extends perpendicular to the width of the handlebar assembly and/or perpendicular to the mounting portion of the handlebar assembly and which is in particular a central plane relative to said width.

BRIEF DESCRIPTION OF THE DRAWINGS

The invention will now be explained in more detail by way of an embodiment. The figures show in.

DESCRIPTION OF THE PREFERRED EMBODIMENT

Figure 1:
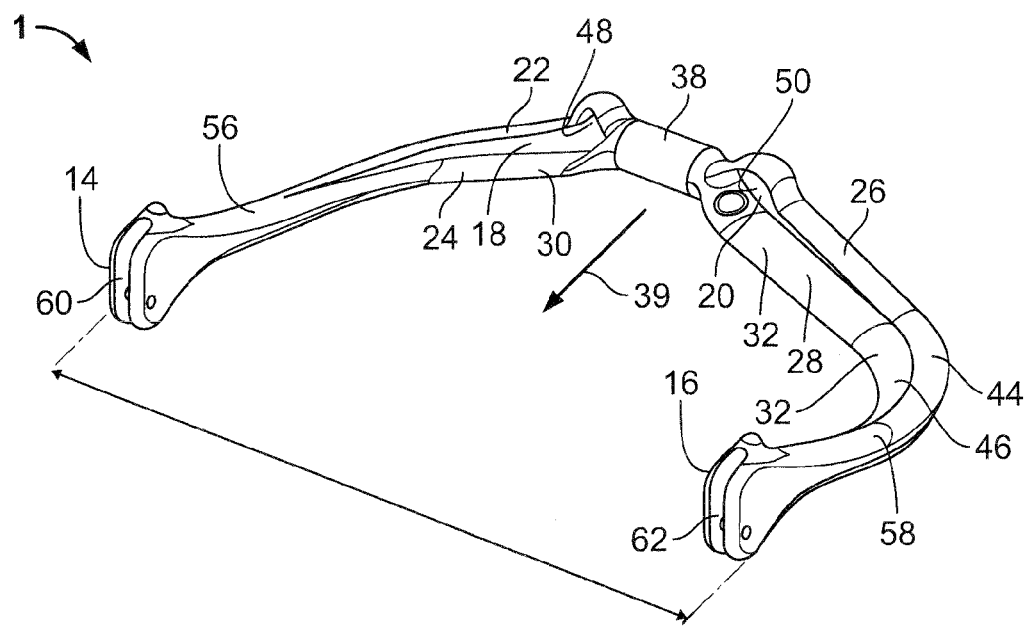
FIG. 1 is a schematic three-dimensional view of an exemplary handlebar assembly according to the invention.
Figure 2:
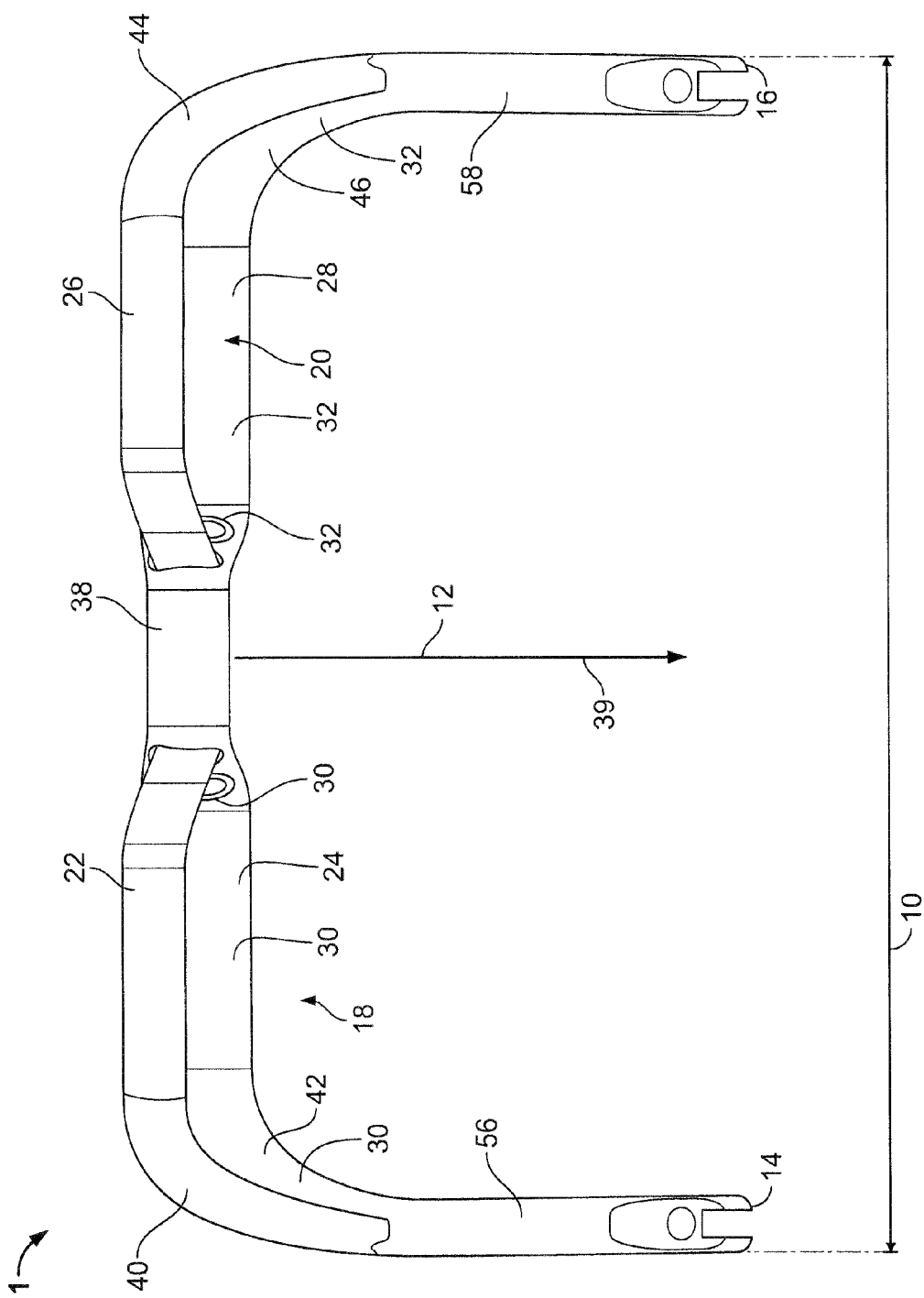
FIG. 2 is a top view of the handlebar assembly according to FIG. 1.
Figure 3:
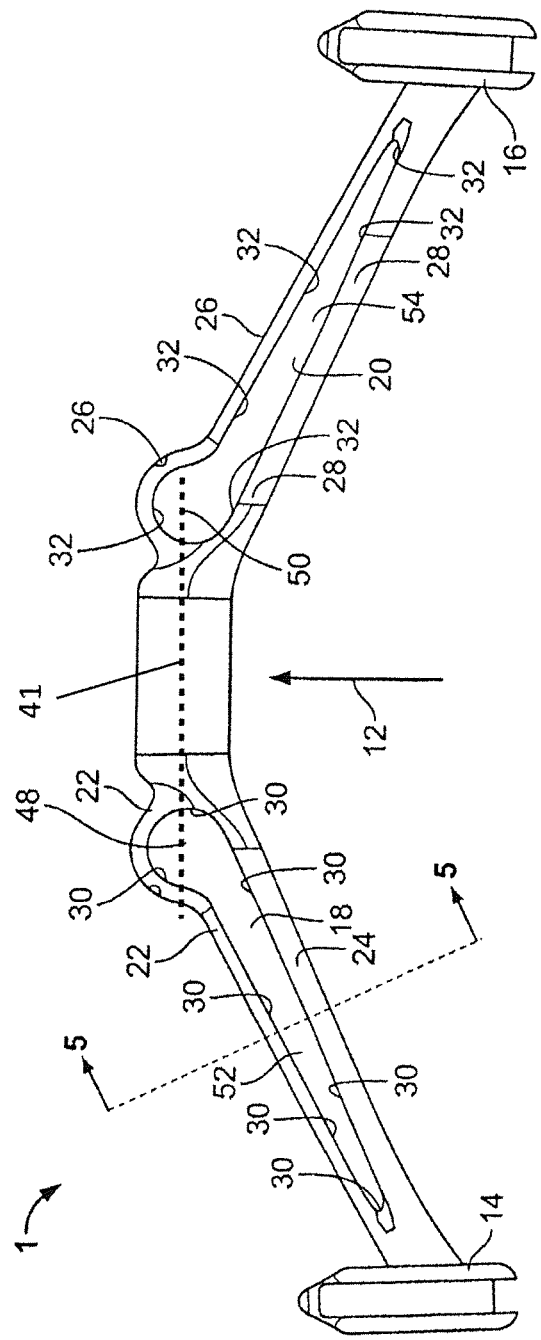
FIG. 3 is a front view of the handlebar assembly according to FIGS. 1 and 2.
Figure 4:
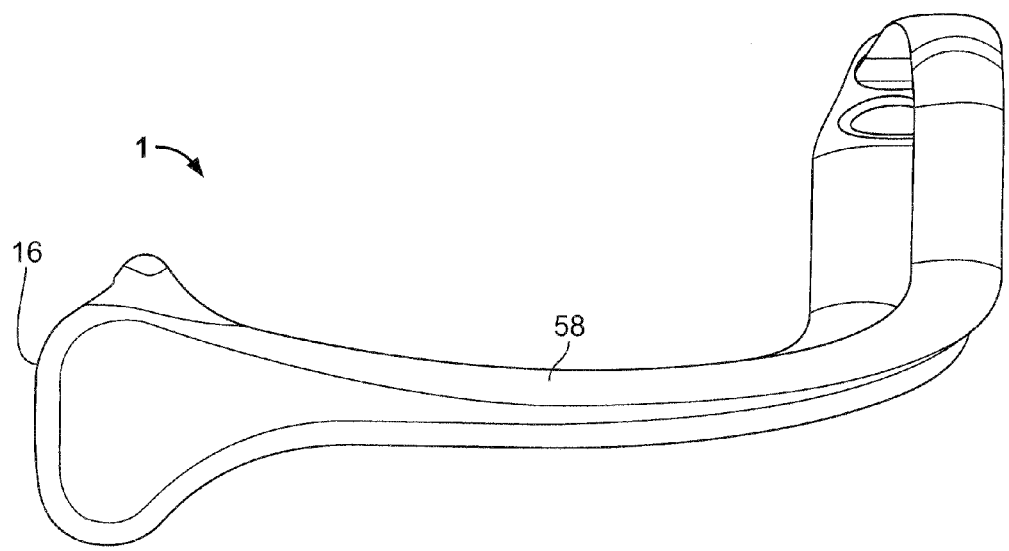
FIG. 4 is a side view of the handlebar assembly according to FIGS. 1 to 3.
Figure 5:
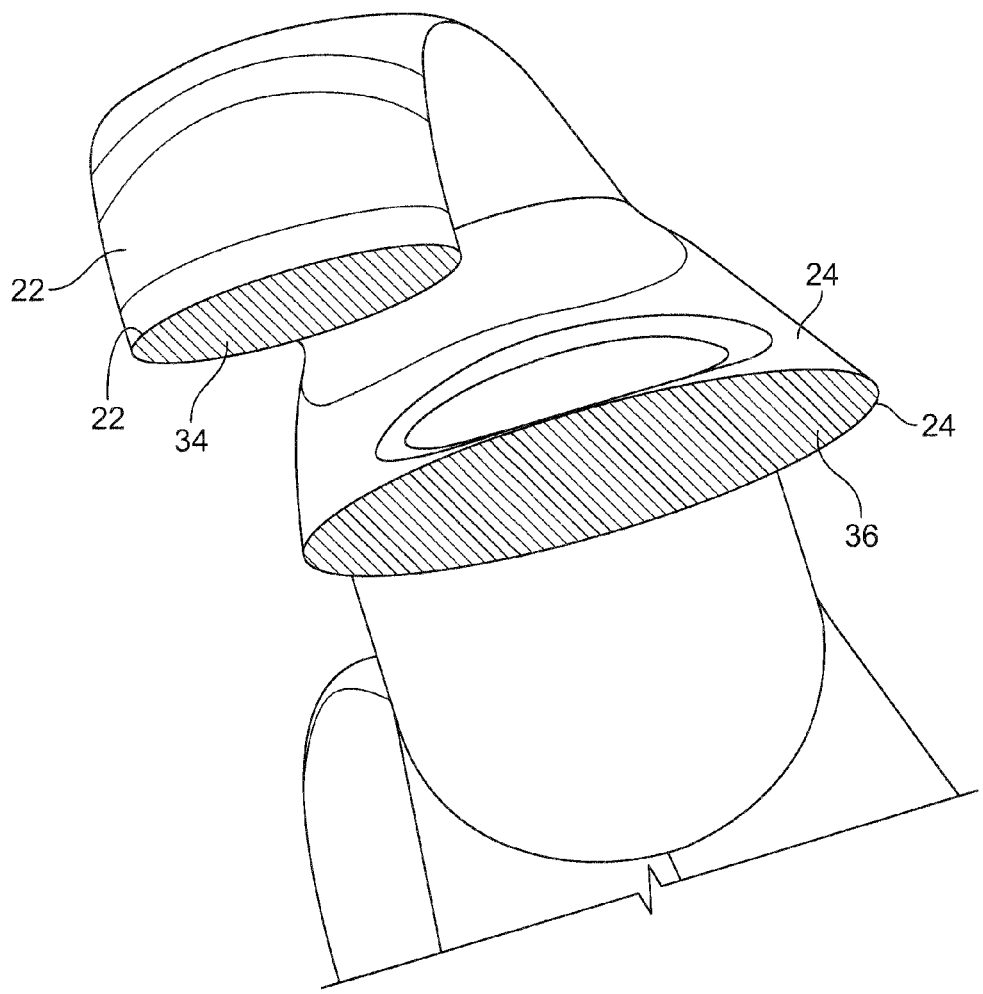
FIG. 5 is a sectional view of the handlebar assembly taken along the line A-A in FIG. 3.

FIGS. 1 to 4 show different views of an exemplary handlebar assembly 1 according to the invention which may also be referred to as a handlebar. FIG. 5 is a sectional view taken along the line A-A in FIG. 3. In FIGS. 2 to 4 exemplary dimensions are indicated in millimeters. The individual dimensions indicated therein and the interaction of the dimensions indicated therein are preferred specific embodiments wherein mention is made that dimensions deviating therefrom are also preferred.

The handlebar assembly 1 is perpendicular in respect of the direction of the width of the handlebar assembly 1 and formed in mirror symmetry in respect of the width 10 located in said direction of the width of the handlebar assembly 1 in respect of the central plane 12 located centrally which in FIG. 2 and FIG. 3 is perpendicular to the plane of the drawing and is schematically indicated by a line 12 therein.

The handlebar assembly 1 comprises a first end 14 and a second end 16. Said ends 14, 16 are free ends of the handlebar assembly 1.

Said ends 14, 16 are located on different sides of the central plane 12. Seen in a top view, the handlebar assembly extends substantially in a U-shape between the first end 14 and the second end 16 as can clearly be taken from the FIG. 2 but also from the FIG. 1. The handlebar assembly diverges along the central extension of the handlebar which herein is substantially in a U-shape or along the U-shape discussed, so as to form a through hole or passage area which is in particular provided for an air flow and—while continuing to follow said central path or the U-shape—subsequently rejoins. In the embodiment this is such that the handlebar assembly 1 diverges along this U-shape existing between the first end 14 and the second end 16 to form a first through hole or passage area 18 and subsequently rejoins again and—herein on the other side of the central plane 12—diverges or separates another time to form a second through hole or passage area 20 and subsequently rejoins again.

In the embodiment according to the FIGS. 1 to 5 the handlebar assembly 1 thus comprises between its first end 14 and its second end 16, two through holes or passage areas 18, 20 which are in particular provided for an air flow.

Said through holes or passage areas 18, 20 are separate from one another such that—in particular when viewing along the U-shape—an area substantially free of a through hole exists between these through holes 18, 20.

As is apparent in FIG. 3, the through holes or passage areas 18, 20 are substantially configured as slots. This is in particular such that the direction of extension present along the U-shape, of said through holes or passage areas 18, 20 is larger or substantially larger than the slot height which is present between the parallel-connected tubes or tube sections 22 and 24 or 26 and 28.

The first through hole or passage area 18 is limited by a wall section 30 closed in circumference. The second through hole or passage area 20 is correspondingly limited by a wall section 32 closed in circumference.

Each of the wall sections 30 and 32 is a section of the outer surface of the handlebar assembly 1.

The first through hole or passage area 18 is formed between parallel-connected tubes or tube sections 22, 24. The second through hole or passage area 20 is formed between the parallel-connected tubes or tube sections 26 and 28.

The exemplary handlebar assembly 1 shown in FIGS. 1 to 5 is made of solid material. As regards the tubes or tube sections 22, 24, this can readily be taken from the FIG. 5. Herein, instead of the section line A-A from FIG. 3, the cross-sectional area 34 of the tube or tube section 22 is illustrated in the region of the section line A-A in FIG. 3, and the cross-sectional area 36 of the tube or tube section 24 lying in this sectional plane or line. It can readily be seen from the cross-hatched illustration that the tubes 22 and 24 are made of solid material.

It should be noted before this background that the term tube or tube section 22, 24, 26, 28 is to be understood in a broad sense and may in particular also be referred to as rod or rod section or strut or strut section.

The parallel-connected tubes or tube sections 22 and 24 or the parallel-connected tubes or tube sections 26 and 28—preferably along their entire lengthwise extension but in particular at least over portions along said lengthwise extension—each have an elliptical cross-sectional area. As concerns the tubes or tube sections 22, 24 this can readily be taken from FIG. 5 where the cross-sectional areas 34, 36 are illustrated in the region of the section A-A. In this conjunction it should be noted though that the cross-sectional areas of the tubes or tube sections 22, 24, 26, 28 may be configured non-consistent or non-constant along the path of the tubes or tube sections 22, 24, 26, 28 in respect of their surface content and/or their geometrical configuration which is particularly preferred. The surface content of this respective cross-sectional area of the tubes or tube sections 22, 24, 26, 28 may in particular vary along the respective tube or tube section 22, 24, 26, 28 and in particular including the case—as is in particular preferred, that the respective cross-sectional area is configured elliptical along the entire path of the respective tube or tube section 22, 24, 26, 28.

Between the first through hole or passage area 18 and the second through hole or passage area 20, a mounting portion 38 of the handlebar assembly 1 is provided. Said mounting area 38 is configured as a cylindrical tube or rod section. The mounting portion 38 is positioned centrally or midpoint in respect of the width 10 of the handlebar assembly 1 and runs in particular in the direction of the width 10. Said mounting portion 38 is intended to be received at or in a handlebar stem of a bicycle so as to secure the handlebar assembly 1 to said stem or the bicycle.

In a preferred configuration the handlebar assembly 1 is mounted to a bicycle or a bicycle stem such that the forward travel direction of the bicycle lies in the direction of the arrow 39.

In the embodiment according to the FIGS. 1 to 5 each of the tubes or tube sections 22, 24, 26, 28 are configured such that—in the plane spanned between the direction of the width and the travel direction—they run initially in the direction of extension of the mounting portion when viewed from the mounting portion and subsequently they are curved such that behind the transition sections 40, 42, 44, 46 they run substantially in the travel direction 39.

Along the U-shape the tubes or tube sections 22 and 24 on the one hand or 26 and 28 on the other hand—all seen from the view of the mounting portion 38—are aligned such relative to one another that the first or second through hole or passage area 18 or 20 initially form a substantially eye-shaped area 48 or 50 which is followed by an—in particular acutely—joining area 52 or 54. The tube or tube section 22 is positioned such relative to the tube or tube section 24 that the flattened areas of said tubes or tube sections 22 and 24 are positioned substantially spaced apart from one another and in particular viewed transverse from these flattened areas. In particular if the cross-sectional area of the tubes or tube sections 22, 24 is elliptic it may be provided that the (large) principal axes of the elliptic cross-sectional shape of the tube or tube section 22 are aligned substantially parallel to the (large) principal axis of the cross-sectional area of the tube or tube section 24 that also lies in the same sectional plane, in respect of the respective identical sectional plane.

A corresponding situation may apply in particular to the relation of the tubes or tube sections 26 and 28.

The handlebar assembly 1 comprises a first grip area 56 and a second grip area 58. In this embodiment the grip areas 56 and 58 substantially extend perpendicular to the direction of extension or longitudinal axis 41 of the mounting portion 38. The first end 14 and the second end 16 each have a receiving area 60 or 62 provided thereat. Said receiving area 60, 62 may for example receive a brake or a brake lever. It may also be provided that this receiving area receives attachments within which further grip areas may be provided.

As can readily be seen in FIG. 3, the tubes or tube sections 22, 26, each of which form an upper limitation of the first or second through hole or passage area 18 or 20, run downwards on average from the view of the central plane 12. As can further readily be seen in FIG. 3, the tubes or tube sections 24, 28, each of which form a lower limitation of the first or second through hole or passage area 18 or 20, run downwards on average from the view of the central plane 12.

It may be provided for example that said upper or lower limitation sections run upwards on average. Preferably the mean gradient angle of these respective upper or lower limitation sections lies between −30° and +30°, particularly preferably between −10° and −30° or between +10° and +30°. It is also preferred that this respective angle is larger than +10°, particularly preferably larger than +20°, or smaller than −10°, particularly preferably smaller than −20°.

The limitation sections of the through hole or passage area 18 or 20 and in particular the upper or lower limitation sections or the tubes or tube sections 22, 24, 26, 28, are configured and or positioned in particular such that an air flow flowing, for example during forward travel and in particular directed parallel to the center plane 12 on the entering side toward the through hole or passage area 18 or 20, from an entering side which in FIG. 3 faces the observer, is guided by means of said limitation sections and in particular of the upper and lower limitation sections, such that on the exit side it is directed away from the center plane or moves progressively away from it. This refers in particular to the average flow direction of the air flow present in particular through the flow profile. In this way it can for example be achieved that by means of a handlebar assembly 1 mounted to the bicycle the air stream flowing head-on toward the rider is partially—in particular to the left and right—guided past him such that the resistance to air flow is correspondingly lowered. A bicycle comprising such a handlebar assembly 1 is particularly preferred.

As the embodiment in particular shows the inventors have succeeded in creating such a sturdy handlebar assembly for bicycles that allows good aerodynamic conditions.

The invention claimed is:

1. A handlebar assembly for a bicycle, the handlebar assembly comprising:
   a central mounting portion extending along a longitudinal axis and including a first end and a second end on said longitudinal axis;
   at least two first tube sections connected to and extending from said first end of the mounting portion, said at least two first tube sections being spaced apart in a vertical direction; and
   at least two second tube sections connected to and extending from said second end of the mounting portion, said at least two second tube sections being spaced apart in a vertical direction,
   each of said at least two first and second tube sections being connected to and diverging from said mounting portion and respectively, rejoining each other to form first and second through holes and outer ends, said first and second through holes extending along said longitudinal axis that is transverse to the vertical direction, said at least two first and second tube sections each being shaped to form a guide for air flow;
   said first and second through holes are each limited by limitation sections on said first and second tube sections, which are configured such that the air flow flowing through said first and second through holes from an entering side of said first and second through holes substantially parallel to a central plane transverse to the longitudinal axis of the central mounting portion is guided by said limitation sections such that the air flow at an exit side of said first and second through holes progressively moves away from said central plane, wherein an average air flow direction of the air flow through the air flow profile is away from said central plane and thereby away from a rider to significantly reduce air flow resistance caused by the rider during forward travel; and
   a grip attached to each of said outer ends of said at least two first and second tube sections for allowing a user to hold and maneuver the handlebar assembly.

2. The handlebar assembly according to claim 1, wherein said first end has said first through hole on one side of said mounting portion and said second end has said second through hole on an opposing side of said mounting portion.

3. The handlebar assembly according to claim 1, wherein said limitation sections include an upper limitation section and a lower limitation section associated with each of said first and second through holes, said upper limitation section and said lower limitation section extending away from said central plane.

4. The handlebar assembly according to claim 1, wherein each of said first and second through holes is configured as a slot.

5. The handlebar assembly according to claim 1, wherein each of said first and second through holes is limited by a wall section closed in circumference.

6. The handlebar assembly according to claim 1, wherein each of said first and second through holes is limited by portions of an outer surface of said tube sections.

7. The handlebar assembly according to claim 1, wherein each of said first and second tube sections forms on respective interiors at least one hollow space.

8. The handlebar assembly according to claim 1, wherein said first and second tube sections are made of a solid material.

9. The handlebar assembly according to claim 1, wherein the mounting portion is located at a midpoint in a center relative to a width defined by a distance between said first and second ends.

10. The handlebar assembly according to claim 1, wherein said first tube sections define said first through hole between said mounting portion and the first end, and said second tube sections define said second through hole between said mounting portion and the second end.

11. The handlebar assembly according to claim 10, wherein a first grip of said grips is between said first through hole and the first end, and a second grip of said grips is between said second through hole and the second end.

12. The handlebar assembly according to claim 1, wherein the first end, the second end and said mounting portion are integrally formed.

13. The handlebar assembly according to claim 1, wherein the first end, the second end and said mounting portion are made of a fibrous composite material.

14. The handlebar assembly according to claim 1, wherein said mounting portion extends transverse to the direction of forward travel of the bicycle.

15. The handlebar assembly according to claim 1, wherein said first and second two tube sections are directly connected to said mounting portion.

* * * * *